United States Patent
Gibbs et al.

(10) Patent No.: US 10,033,322 B2
(45) Date of Patent: Jul. 24, 2018

(54) CLOSED-TRANSITION VARIABLE-FREQUENCY DRIVE APPARATUS AND METHODS

(71) Applicant: Eaton Corporation, Cleveland, OH (US)

(72) Inventors: Irving Albert Gibbs, Mills River, NC (US); Thomas Arthur Farr, Candler, NC (US); Gregory John Venhaus, Arden, NC (US); Aaron H. VanderMeulen, Asheville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 94 days.

(21) Appl. No.: 15/057,568

(22) Filed: Mar. 1, 2016

(65) Prior Publication Data

US 2017/0126164 A1 May 4, 2017

Related U.S. Application Data

(60) Provisional application No. 62/248,773, filed on Oct. 30, 2015.

(51) Int. Cl.
*H02P 1/30* (2006.01)
*H02P 27/04* (2016.01)

(52) U.S. Cl.
CPC .................... *H02P 27/04* (2013.01)

(58) Field of Classification Search
CPC ........ H02P 27/06; H02P 1/30; H02P 23/0086; H02P 27/04; H02P 27/08
USPC ....... 318/503, 779, 786, 790, 801, 807, 808, 318/811, 434
See application file for complete search history.

(56) References Cited

U.S. PATENT DOCUMENTS

| | | | |
|---|---|---|---|
| 3,805,139 A | 4/1974 | Hoffman, Jr. et al. | |
| 4,748,394 A * | 5/1988 | Watanabe | B66B 25/00 198/330 |
| 6,295,215 B1 * | 9/2001 | Faria | H02J 9/062 363/124 |
| 6,906,933 B2 * | 6/2005 | Taimela | H02J 3/32 363/34 |

(Continued)

FOREIGN PATENT DOCUMENTS

EP 1 928 081 A2 6/2008
JP 2001-190091 A 7/2001

OTHER PUBLICATIONS

International Search Report and Written Opinion Corresponding to International Application No. PCT/US2016/031116; dated Aug. 12, 2016; 11 Pages.

*Primary Examiner* — Bentsu Ro
*Assistant Examiner* — Thai Dinh
(74) *Attorney, Agent, or Firm* — Ward and Smith, P.A.

(57) ABSTRACT

A system includes a variable frequency drive (VFD) comprising an inverter having an output configured to be coupled to a motor and a switch configured to couple a power source to the motor to bypass the VFD. The system further includes a control circuit configured to synchronize the VFD to the power source, to operate the switch to couple the power source and the VFD in parallel and to subsequently disable the inverter responsive to a current of the inverter. In some embodiments, a PWM frequency of the VFD may be temporarily increased when transferring the motor from the power source to the VFD.

20 Claims, 12 Drawing Sheets

(56) References Cited

U.S. PATENT DOCUMENTS

| | | | | |
|---|---|---|---|---|
| 8,803,361 B2* | 8/2014 | Johansen | ............... | H02J 9/062 |
| | | | | 307/64 |
| 8,853,992 B2* | 10/2014 | Boom | .................... | H02P 23/02 |
| | | | | 318/727 |
| 2008/0174257 A1* | 7/2008 | Schnetzka | ............ | F25B 49/025 |
| | | | | 318/434 |
| 2015/0084553 A1 | 3/2015 | Farr et al. | | |

* cited by examiner

CLOSED-TRANSITION VARIABLE-FREQUENCY DRIVE APPARATUS AND METHODS

RELATED APPLICATION

The present application claims the priority of U.S. Provisional Application Ser. No. 62/248,773, filed Oct. 30, 2015, the content of which is incorporated herein by reference in its entirety.

BACKGROUND

The inventive subject matter relates to motor drive apparatus and methods and, more particularly, to variable-speed drive apparatus and methods.

Acceleration of an AC motor can cause large inrush currents and produce uncontrolled torque that can generate damaging mechanical shock. Accordingly, large motors are often started using a soft starter or a variable frequency drive (VFD). A soft starter reduces inrush current by limiting the voltage applied to the motor until the motor is up to speed. A VFD can provide even greater control by varying the output voltage frequency to allow the motor to gradually be brought up to speed at rated torque.

Figure 1:
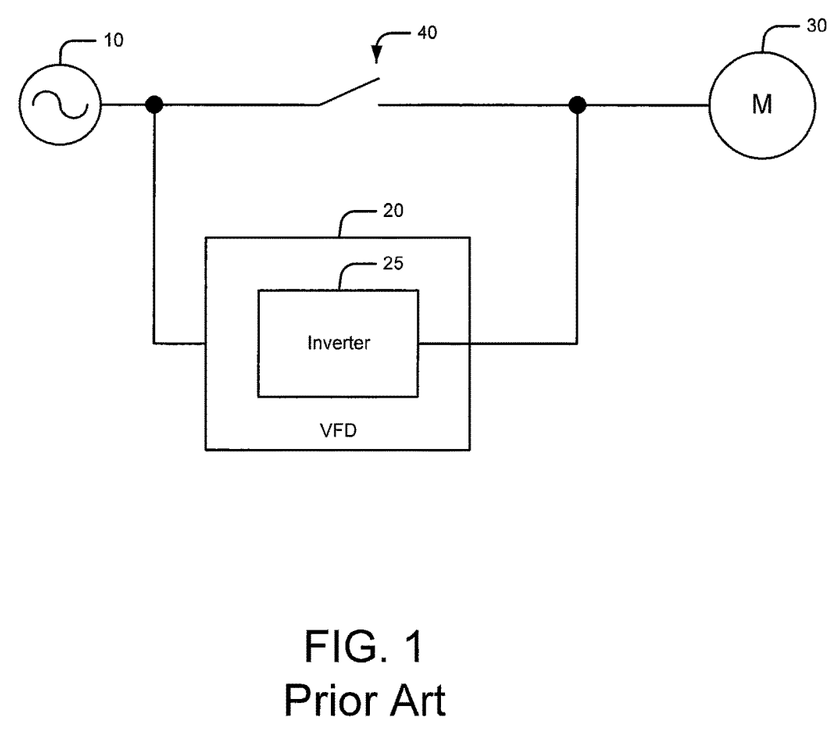
FIG. 1 is a schematic diagram illustrating a conventional motor starting arrangement.

A typical application of a VFD for motor starting and stopping is illustrated in FIG. 1. A VFD 20 has an input coupled to an AC source 10 and an output coupled to a load, such as a motor 30. A bypass switch 40 is configured to directly couple the AC source to the motor 30, bypassing the VFD 20. To start the motor 30, the VFD 20 is used to accelerate the motor 30 up to a desired frequency while the bypass switch 40 is open. When the desired frequency is reached, the VFD 20 is disconnected from the motor 30 and the bypass switch 40 is closed. To stop the motor 30, the VFD 20 output is brought to the desired frequency and connected to the motor 30 after the bypass switch 40 is opened.

SUMMARY

Some embodiments of the inventive subject matter provide an apparatus including a variable frequency drive (VFD) having an input configured to be coupled to an AC source and an output configured to be coupled to a load (e.g., a motor). A bypass switch is configured to couple the AC source to the load. The apparatus further includes a control circuit configured to transition the load between the AC source and the VFD by synchronizing the VFD to an AC voltage of the AC source, initiating a transition of the bypass switch and disabling the VFD based on a current of the VFD following the initiation of the transition.

In some embodiments, the control circuit may be configured to initiate a closure of the bypass switch and to subsequently disable an inverter of the VFD responsive to a detected current of the inverter following the initiation of the closure. The control circuit may be configured to disable the inverter after the bypass switch couples the AC source to the load. The control circuit may be configured to detect a current of the inverter prior to initiating the closure and to disable the inverter based on a criterion derived from the detected current of the inverter prior to initiating the closure. The control circuit may be configured to detect the current of the inverter prior to initiating the closure responsive to a command to transition the load from the inverter to the AC source.

In some embodiments, the control circuit may be further configured to transfer the load from the AC source to the VFD by initiating an opening of the bypass switch and subsequently selectively enabling and disabling an inverter of the VFD responsive to a detected current of the inverter following the initiation of the opening. In further embodiments, the control circuit may be further configured to transfer the load from the AC source to the VFD by increasing a modulation frequency of the VFD, initiating an opening of the bypass switch and then decreasing the modulation frequency after the bypass switch is fully open.

Some embodiments provide a system including a VFD including an inverter having an output configured to be coupled to a motor, a switch configured to couple a power source to the motor to bypass the VFD, and a control circuit configured to synchronize the VFD to the power source, to operate the switch to couple the power source and the VFD in parallel and to subsequently disable the inverter responsive to a current of the inverter. The control circuit may be configured to couple the power source and the VFD in parallel during a transition from driving the motor using only the VFD to driving the motor using only the power source and may be further configured to determine a current of the inverter prior to the transition and to derive the current threshold from the determined current. The control circuit may be configured to couple the power source and the VFD in parallel during a transition from driving the motor using only the power source to driving the motor using only the VFD and may be further configured to selectively enable and disable and enable the inverter responsive to the current during the transition. In still further embodiments, the control circuit may be configured to couple the power source and the VFD in parallel during a transition from driving the motor using only the power source to driving the motor using only the VFD and may be further configured to increase a modulation frequency prior to coupling the power source and the VFD in parallel and to reduce the modulation frequency when power source is no longer coupled to the motor.

In some embodiments, methods include synchronizing a VFD to a power source, operating a bypass switch to couple the power source and the VFD in parallel to a motor, and subsequently disabling an inverter of the VFD responsive to a current of the inverter. Subsequently disabling the inverter of the VFD responsive to the current of the inverter the control circuit may include disabling the inverter responsive to the current crossing a current threshold. Operating the bypass switch to couple the power source and the VFD in parallel to the motor may include coupling the power source and the VFD in parallel during a transition from driving the motor using only the VFD to driving the motor using only the power source and the methods may further include determining a current of the inverter prior to the transition and deriving the current threshold from the determined current.

In some embodiments, the methods may further include increasing a PWM frequency of the inverter, coupling the power source and the VFD in parallel during a transition from driving the motor using only the power source to driving the motor using only VFD with the inverter using the increased PWM frequency, and then reducing the PWM frequency when the power source is no longer coupled to the motor. In some embodiments, operating the bypass switch to couple the power source and the VFD in parallel to the motor may include coupling the power source and the VFD in parallel during a transition from driving the motor using only the power source to driving the motor using only the VFD, and the methods may further include selectively enabling and disabling the inverter responsive to the current during the transition.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter may provide improved VFD-based motor starting by using closed transitions in which a VFD is momentarily coupled in parallel with a primary AC source, such as a utility source. During such closed transitions, the VFD may monitor its inverter current and disable the inverter once the inverter current meets a predetermined criterion that indicates that the motor has been fully connected to the primary source. Because paralleled operation may significantly increase inverter current over a nominal load current, the predetermined criterion may be the inverter current exceeding a level that is greater than a level of the nominal load current. Crossing the threshold may be indicative of the parallel connection of the VFD and the primary AC source, and the threshold may represent a current level less than a current level that can damage the inverter. A similar approach may be used to transition the motor back to the VFD, wherein the VFD is synced to the primary source and temporarily connected in parallel with the primary source until the bypass switch is fully opened. During the transition, the inverter may be intermittently disabled responsive to the inverter current crossing a predetermined threshold to prevent damaging the inverter. In some embodiments, however, a transition from the primary AC source to the VFD may including momentarily increasing (e.g., doubling) the PWM frequency of the VFD while the VFD and the primary source are paralleled, and then reducing the VFD PWM frequency after primary source is no longer coupled to the load.

Figure 2:
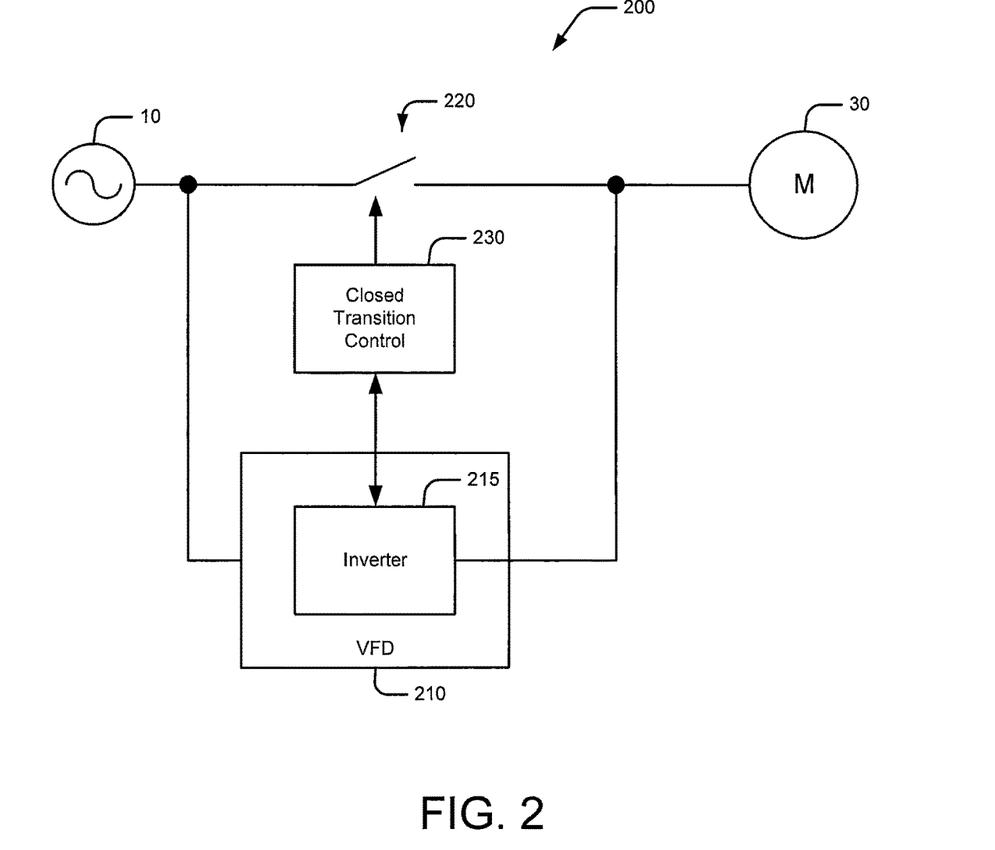
FIG. 2 is a schematic diagram illustrating an apparatus according to some embodiments of the inventive subject matter.

FIG. 2 illustrates an apparatus 200 according to some embodiments of the inventive subject matter. The apparatus 200 includes a variable frequency drive (VFD) 210, which is configured to receive power from an AC source 10 (e.g., a utility source) and includes an inverter 215 configured to drive a motor 30. The apparatus 200 further includes a bypass switch 220 configured to bypass the VFD 210 to drive the motor 30 from the AC source 10. A closed transition controller 230 is configured to transition the motor between the AC source 10 and the inverter 215 using closed transitions in which the bypass switch 220 is closed while the inverter 215 is active and coupled to the motor 30, as explained in greater detail below.

Figure 3:
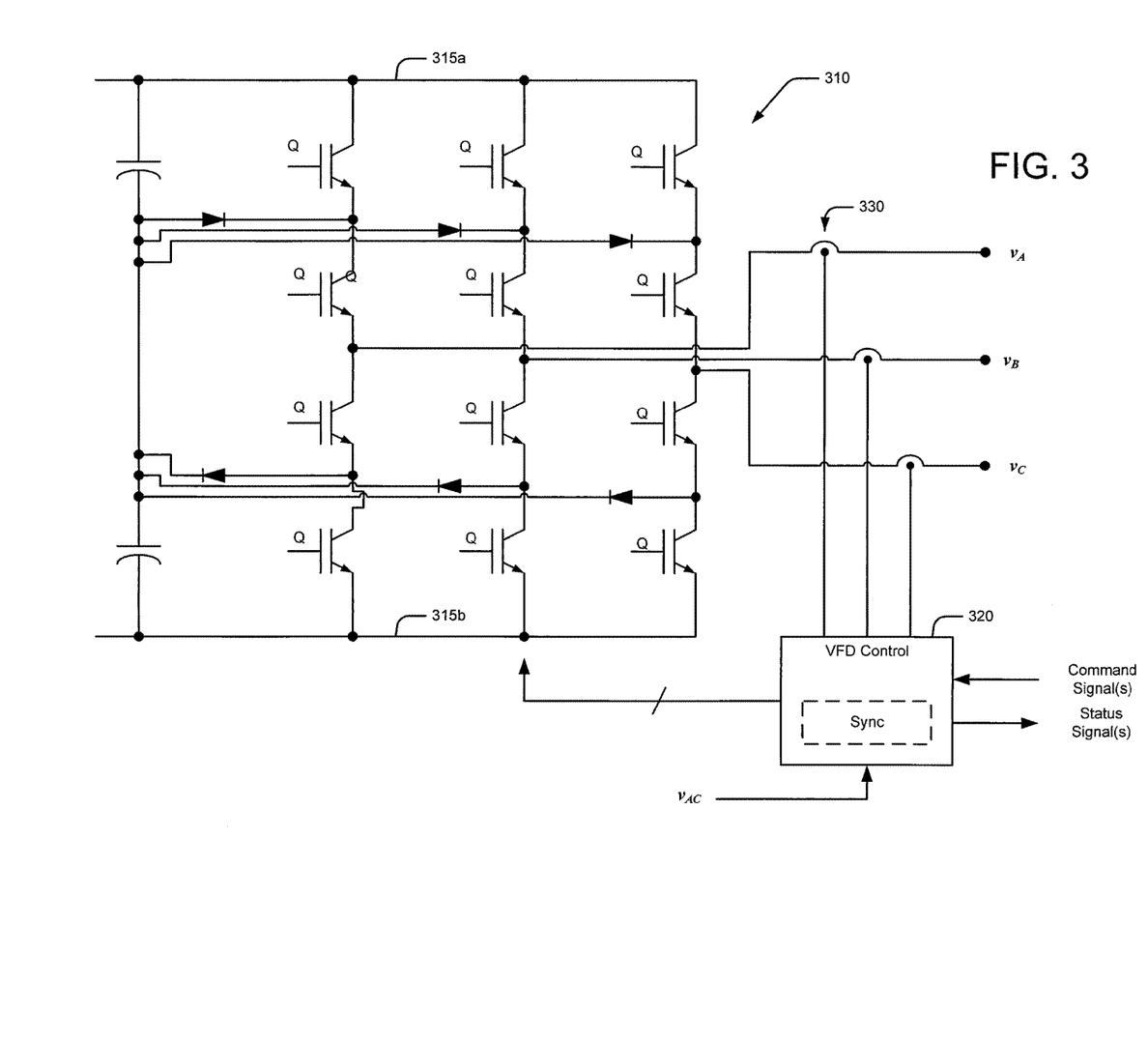
FIG. 3 is a schematic diagram illustrating an inverter arrangement for the apparatus of FIG. 2.

FIG. 3 illustrates an exemplary inverter arrangement that may be used for the VFD 210 of FIG. 2. The inverter 215 of FIG. 2 may a three-phase multilevel inverter 310, comprising respective phase legs that are coupled between first and second DC buses 315a, 315b. Each of the legs includes four series-connected insulated-gate bipolar transistors (IGBTs) Q. The DC buses 315a, 315b may be powered by, for example, a rectifier (not shown) having an input configured to be coupled to an AC source, such as the AC source 10 of FIG. 2. A VFD controller 320 operates the IGBTs Q to generate AC phase voltages $v_A$, $v_B$, $v_C$ responsive to inverter phase currents measured by current detectors 330, e.g., current transformers (CTs) or other current sensors.

As further shown, the VFD controller 320 may be configured to receive at least one voltage reference signal $v_{AC}$, which may be representative of at least one voltage (e.g., A, B and C phase voltages) provided by the AC source 10 of FIG. 2. The VFD controller 320 may be configured to activate the inverter 310 and synchronize the phase voltages $v_A$, $v_B$, $v_C$ to the voltage reference signal $v_{AC}$ responsive to a transition command signal, e.g., a signal from the closed-transition controller 230 of FIG. 2. The VFD controller 320 may also be configured to transmit status signals, for example, a signal indicating that synchronization has been achieved, to such a transition controller.

It will be appreciated that the VFD controller 320 may be implemented using any of a number of different types of analog and/or digital circuitry, such as a microcontroller and associated analog and/or digital peripheral circuitry. It will be further understood that the multi-level inverter 310 is an example of a type of inverter circuitry that may be used in some embodiments, and that a variety of other types of inverter configurations may be used in other embodiments.

Figure 4:
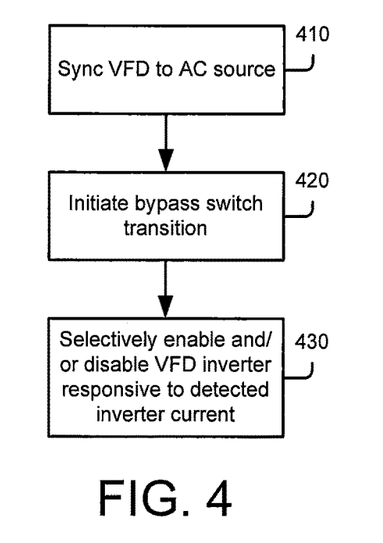
FIGS. 4-8 are flowcharts illustrating operations of the apparatus of FIG. 2 according to some embodiments.

FIG. 4 is a flowchart illustrating exemplary operations of the apparatus 200 of FIG. 2. In order to effect a transition of the motor 30 from the AC source 10 to the VFD 210 or vice versa, the transition controller 230 causes the VFD 210 to sync to the AC waveform of the AC source 10 (block 410). The transition controller 230 initiates a transition (e.g., an opening or closing) of the bypass switch 220 (block 420). The VFD 210 selectively enables and/or disables the inverter 215 responsive to a detected inverter current, which may be, for example, one or more of the currents measured by the current sensors 330 illustrated in FIG. 3 (block 430).

Figure 5:
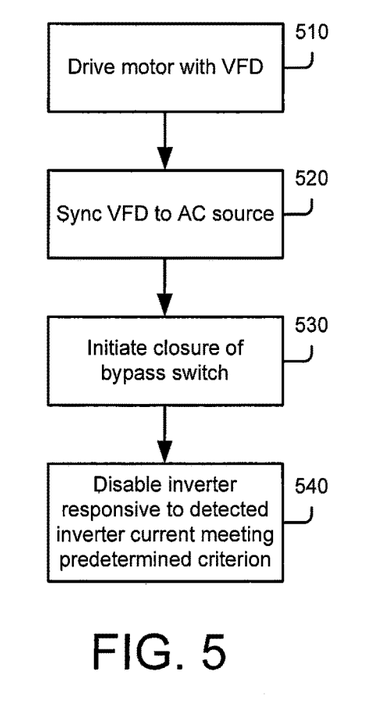

FIG. 5 illustrates operations to effect a transition of the motor 30 from the VFD 210 to the AC source 10 (e.g., during a startup procedure for the motor 30). While the VFD 210 drives the motor 30 (block 510), the VFD 210 is synced to the AC source 10 (block 520). After synchronization is achieved, closure of the bypass switch 220 is initiated (block 530). While the bypass switch 220 is transitioning to the closed state, the VFD 210 monitors the inverter current and, when the current meets a predetermined criterion indicating that the bypass switch 220 has closed, disables the inverter 215 so that it no longer drives the motor 30 (block 540). The predetermined criterion may, for example, the inverter current crossing a threshold derived from a nominal load current associated with the motor 30. Crossing the threshold may indicate that the bypass switch 22Q has fully closed and that the VFD 210 is connected in parallel with the AC source 10. The threshold may be selected to prevent damage to the inverter 215 due to excessive current levels.

Figure 6:
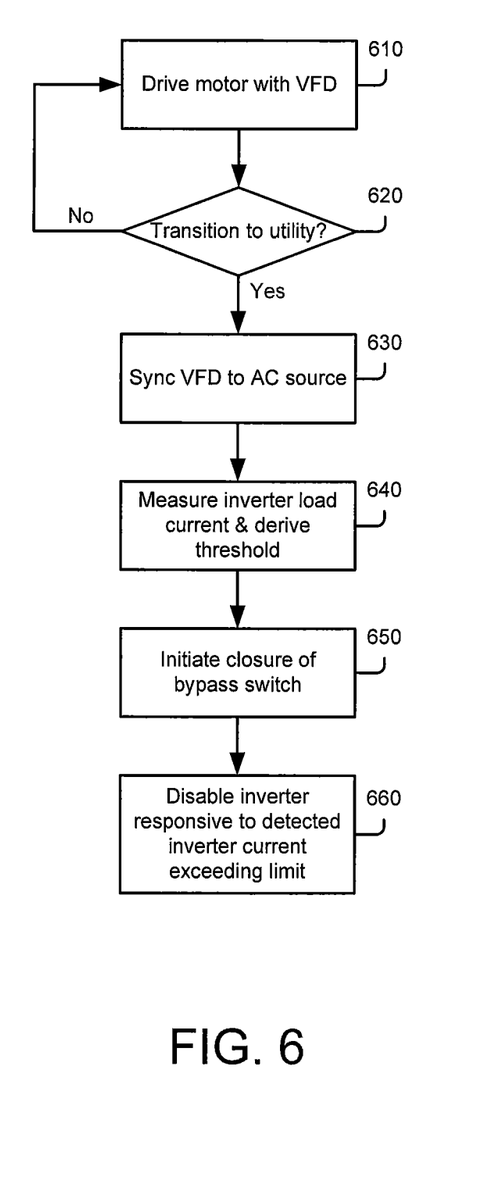

FIG. 6 illustrates detailed operations for achieving such a transition according to further embodiments. While driving the motor 30 with the VFD 210, the transition controller 230 may receive a command to transition to direct drive from the AC source 10 (blocks 610, 620). In response, the transition controller 230 may command the VFD 210 to sync itself to the AC source 10, measure the current inverter current (i.e., the level of current currently required to drive the motor 30), and derive a current threshold from the measured current (blocks 630, 640). The current threshold may, for example, correspond to the measured load current plus a predetermined margin (e.g., 20%). The transition controller 230 may then initiate closure of the bypass switch 220 (block 650). While the bypass switch 220 is transitioning, the VFD 220 may monitor the inverter current, and may disable the inverter 215 of the VFD 220 when the monitored current passes the current threshold, indicating that the bypass switch 220 has fully closed and the VFD 210 and the AC source are connected in parallel (block 660).

Figure 7:
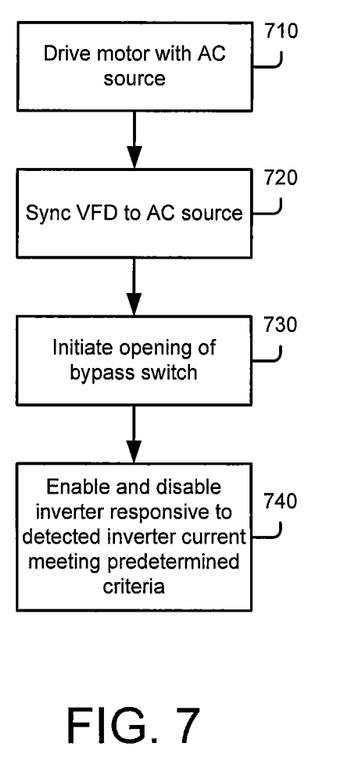

FIG. 7 illustrates operations to effect a transition of the motor 30 from the AC source 10 to the VFD 210 to the AC source 10 when, for example, ramping down the motor 30. While the AC source 10 is driving the motor 30 (block 710), the VFD 210 is synced to the AC source 10 (block 720). After synchronization is achieved, opening of the bypass switch 220 is initiated (block 730). While the bypass switch 220 is transitioning to the open state, the VFD 210 monitors the inverter current and selectively enables and disables the inverter 215 so that, for example, currents in transistors of the inverter 215 are limited to reduce the likelihood of device failure (block 740). After the bypass switch 220 has finally opened and excessive current transients subside, the VFD 210 can leave the inverter 215 enabled and drive the motor 30 alone. The VFD 210 may then be used to decelerate the motor 30 to a stop.

Figure 8:
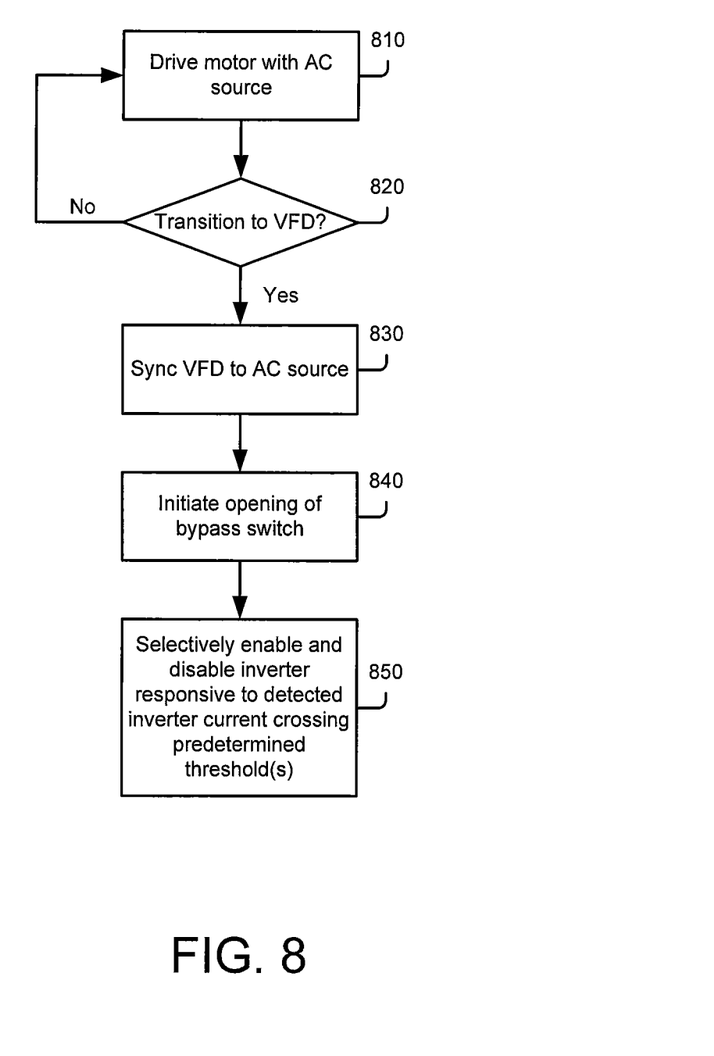

FIG. 8 illustrates detailed operations for achieving such a transition according to further embodiments. While driving the motor 30 directly from the AC source 10, the transition controller 230 may receive a command to transition to driving the motor 30 with the VFD 210 (blocks 810, 820). In response, the transition controller 230 may command the VFD 210 to sync itself to the AC source 10 (block 830). The transition controller 230 may then initiate opening of the bypass switch 220 (block 840). While the bypass switch 220 is transitioning, the VFD 220 may monitor the inverter current, and may selectively enable and disable the inverter 215 of the VFD 210 based on the monitored current (block 850). In particular, the inverter 215 may be disabled when the inverter current exceeds a first predetermined threshold that may reduce the likelihood of damaging the inverter 215. The inverter 215 may be re-enabled when the monitored current falls below a second predetermined threshold, thus allowing the VFD 210 to continue to drive the motor 30 while the bypass switch 220 is transitioning. Once the bypass switch 220 has settled into a fully open state, the inverter 215 can remain enabled to drive the motor 30.

Figure 9:
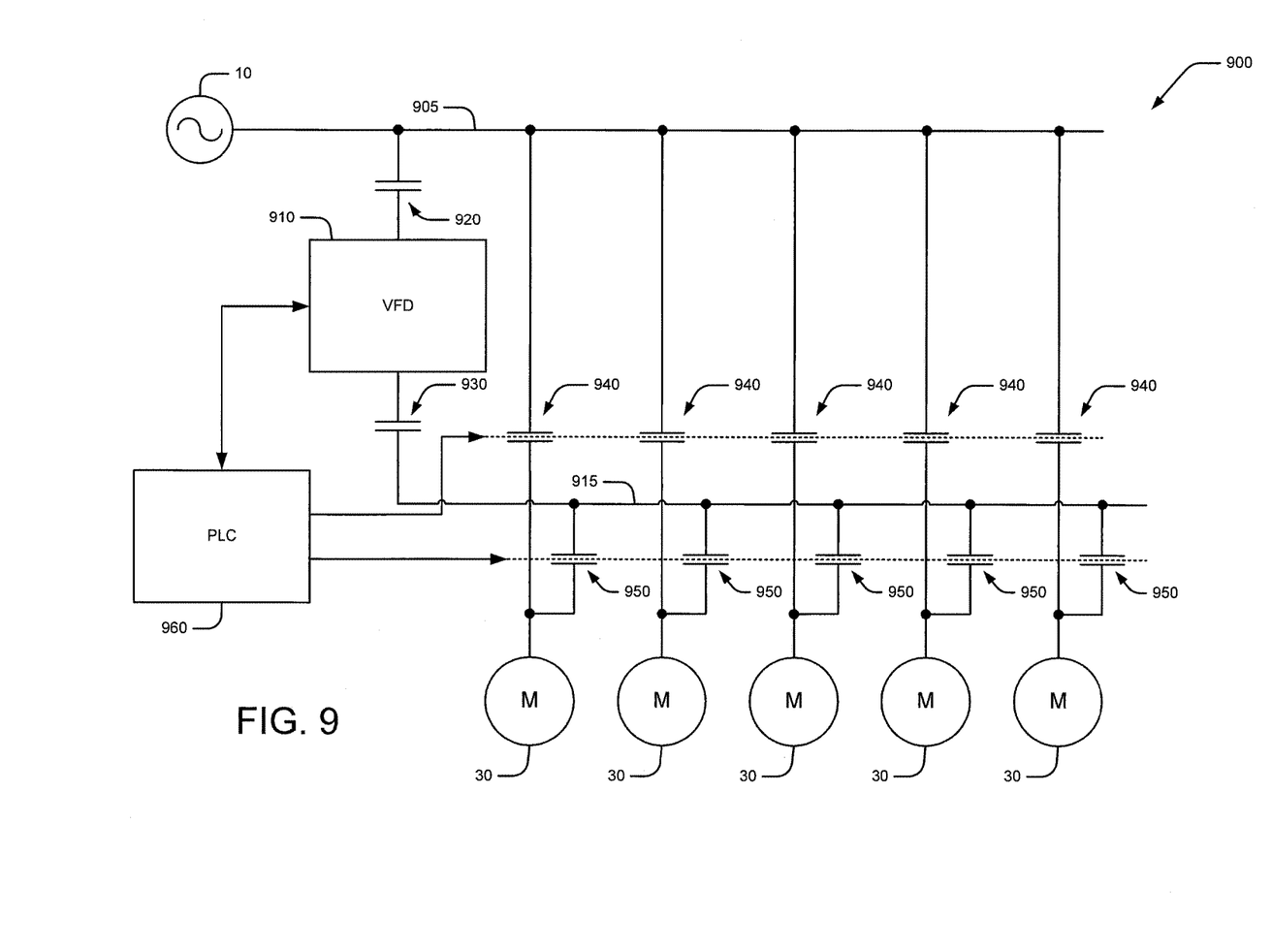
FIG. 9 is a schematic diagram illustrating an apparatus for driving multiple motors according to further embodiments.

FIG. 9 illustrates an exemplary application according to further embodiments of the inventive subject matter. A system for controlling a plurality of motors 30 using a single VFD 910 includes an input power bus 905 coupled to an AC power source 10 (e.g., a utility source). The VFD 910 has a power input configured to be coupled to the input power bus 905 via an input contactor 920 and an output configured to be coupled to a variable frequency bus 915 via an output contactor 930. Respective bypass contactors 940 are configured to couple and decouple respective ones of the motors 30 to and from the input power bus 905. Respective motor select contactors 950 are configured to couple and decouple respective ones of the motors 30 to and from the VFD output bus 915. A programmable logic controller (PLC) 960 controls the motor select and bypass contactors 940, 950 and the VFD 910. The PLC 960 is configured to support sequential startup of the motors 30, transition of the motors 30 to the AC source 10 and ramp down of the motors 30 along the lines described above. Although not shown, additional components may be present, such as reactors connected between the contactors 940 and the input power bus 905 used to limit currents.

Figure 10:
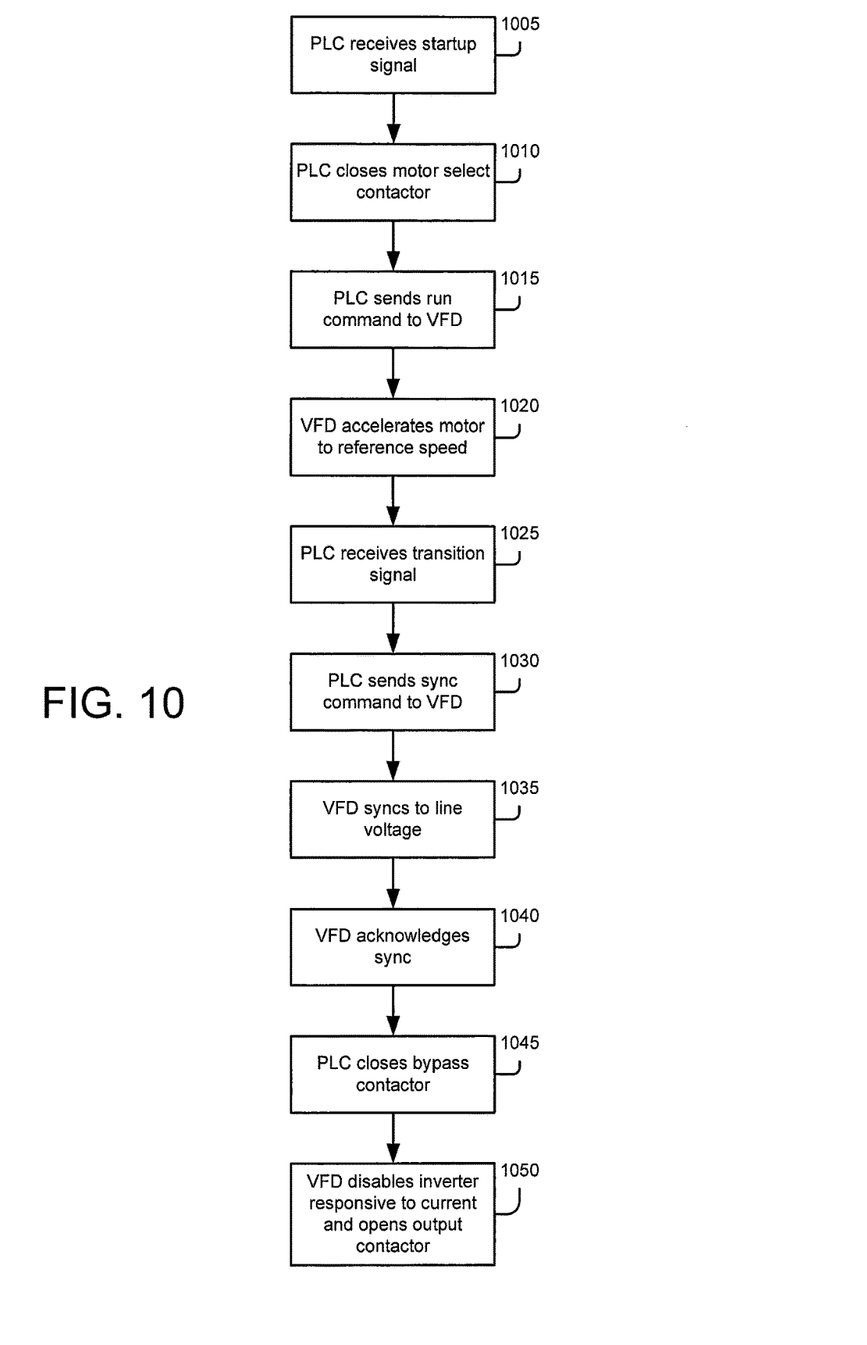
FIGS. 10 and 11 are flowcharts illustrating operations of the apparatus of FIG. 9 according to further embodiments.

FIG. 10 illustrates exemplary operations for starting up and transitioning one of the motors 30. The PLC 960 receives a startup command signal from a user (block 1005). The PLC 960 closes the corresponding motor select contactor 950 and sends a run command to the VFD 910 (blocks 1010, 1015). The VFD 910 accelerates the motor 30 to a reference speed (block 1020).

To begin a transition to the AC source 10, the PLC 960 receives a sync command signal and responsively sends a command to the VFD 910 to synchronize itself to the voltage of the AC source 10 (blocks 1025, 1030). The VFD 910 responsively synchronizes and acknowledges synchronization to the PLC 960 (blocks 1035, 1040). The PLC 960 initiates closure of the associated bypass contactor 940 (block 1045). The VFD 910 disables its inverter responsive to its inverter current after the bypass contactor 950 closes using the techniques described above, and subsequently opens its output contactor 930 (block 1050). The above operations can be repeated to sequentially bring the motors 30 up to speed and transition the motors 30 to running directly off the AC source 10.

Figure 11:
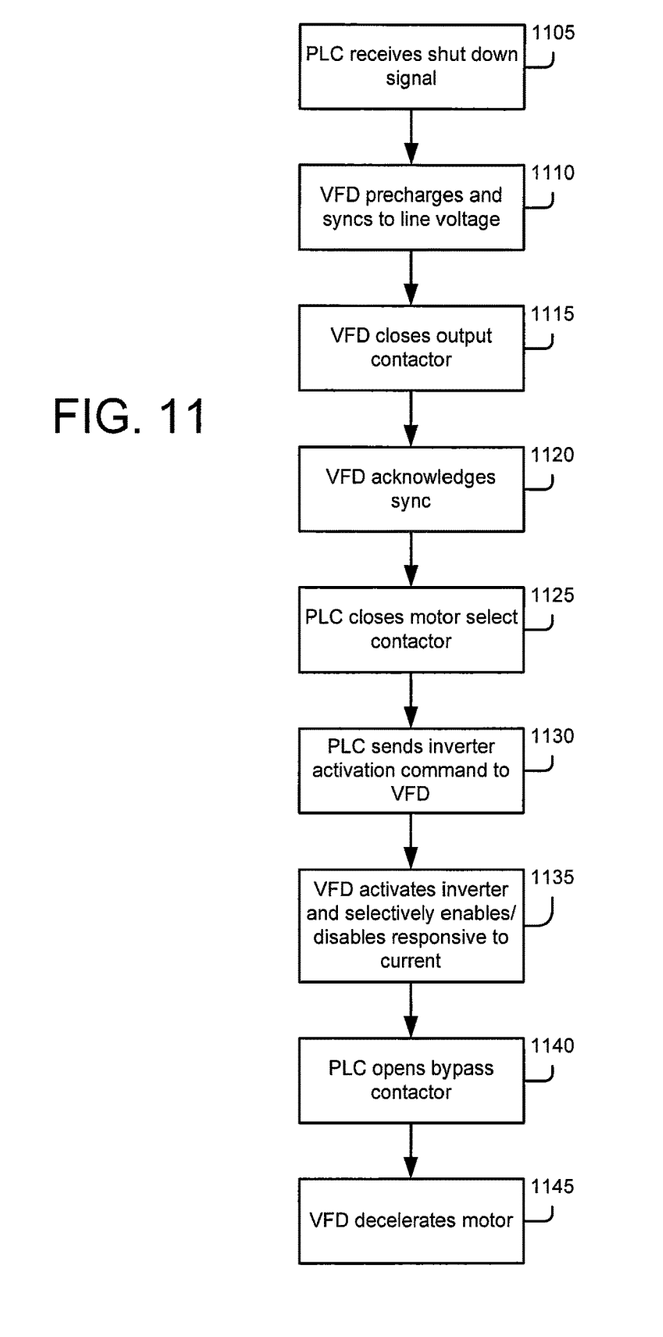

FIG. 11 illustrates exemplary operations for transitioning one of the motors 30 to the VFD 910 for eventual deceleration and shutdown. The PLC 960 receives a shutdown command signal and responsively causes the VFD 910 to precharge its DC bus and sync to the voltage of the AC source 10 (blocks 1105, 1110). The VFD 910 closes its output contactor 930 and acknowledges synchronization (blocks 1115, 1120). The PLC 960 closes the appropriate motor select contactor 950 and sends an inverter activation command signal to the VFD (blocks 1125, 1130). The VFD 910 activates its inverter and subsequently selectively enables and disables the inverter responsive to the inverter current as PLC 960 opens the appropriate bypass contactor 940 (blocks 1135, 1140). Once the motor 30 has transitioned to the VFD 910, the VFD 910 can decelerate the motor (block 1145).

Figure 12:
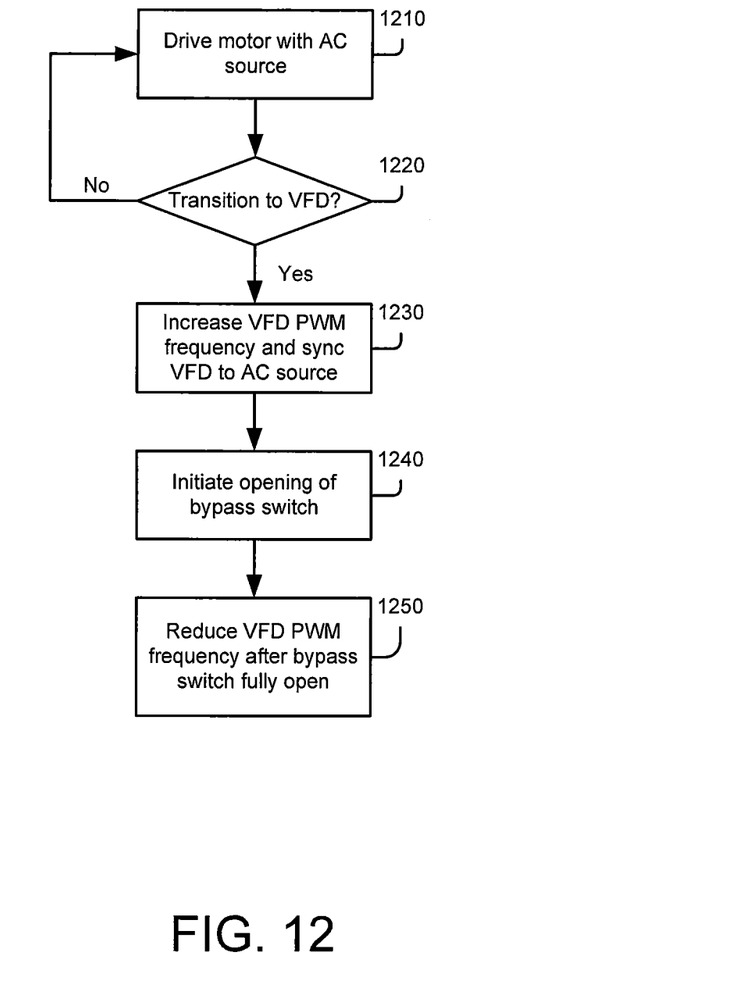
FIG. 12 is a flowchart illustrating operations for transfer of a load from an AC source to a VFD.

FIG. 12 illustrates source-to-VFD transfer operations of the apparatus of FIG. 2 according to further embodiments. While driving the motor 30 directly from the AC source 10, the transition controller 230 may receive a command to transition to driving the motor 30 with the VFD 210 (blocks 1210, 1220). In response, the transition controller 230 may command the VFD 210 to increase (e.g., double) the PWM frequency used by the inverter 215 (e.g., the frequency at which the transistors Q of an inverter such as the inverter 300 of FIG. 3 are modulated) and sync itself to the AC source 10 (block 1230). The transition controller 230 may then initiate opening of the bypass switch 220 (block 1240). After the bypass switch 220 is fully open, the VFD 220 may change to a lower inverter PWM frequency for deceleration of the motor 30 (block 1250).

Figure 13:
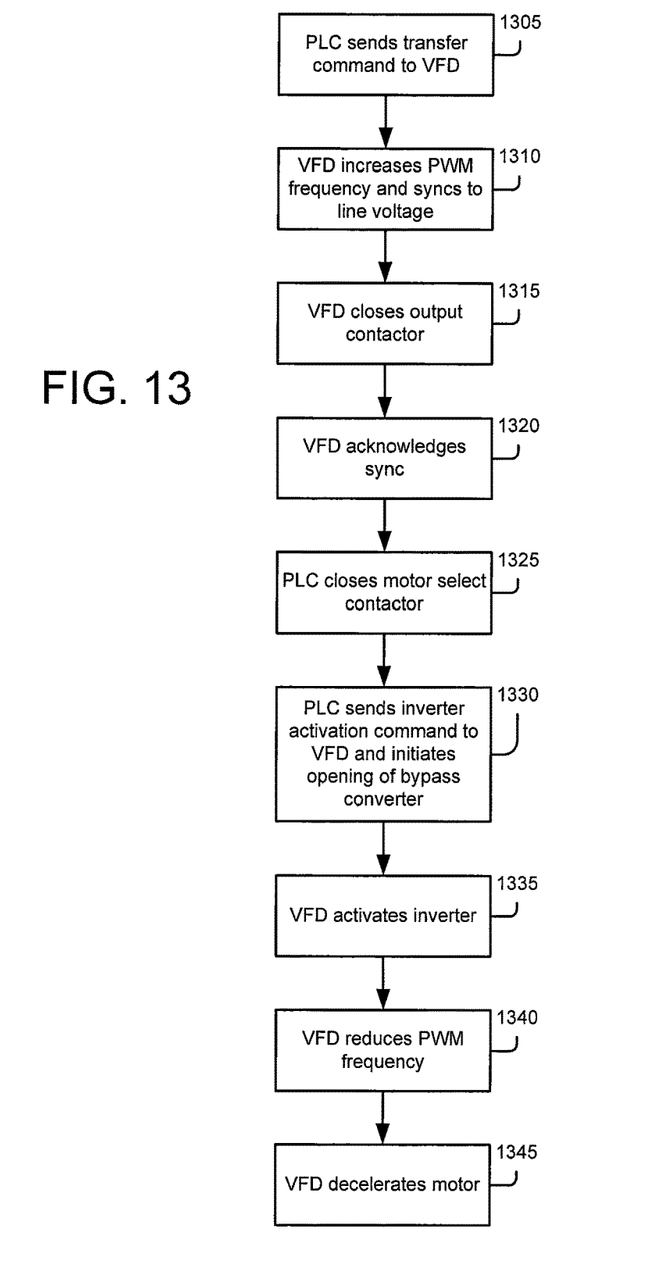
FIG. 13 is a flowchart illustrating operations of the apparatus of FIG. 9 according to further embodiments.

FIG. 13 illustrates transfer operations for one of the motors 30 of FIG. 9 using operations along the line discussed above with reference to FIG. 12 according to further embodiments. The PLC 960 sends a transfer command to the VFD 910 (block 1305). In response, the controller of the VFD 910 increases (e.g., doubles) the PWM frequency to be used by the inverter of the VFD 910 and syncs to the frequency of the AC source 10 without activating the inverter (blocks 1310). Once the VFD 910 is synced, it closes its output contactor 930 and acknowledges sync to the PLC 960 (blocks 1315, 1320). In response, the PLC 960 closes the appropriate motor select contactor 940, sends an inverter activation command to the VFD 910 and initiates opening of the bypass contactor 940 (blocks 1325, 1330). Concurrent with operation of the bypass contactor 940, the VFD 910 activates its inverter (block 1335) before the bypass contactor 940 is open, thus briefly (e.g., for 50 to 100 milliseconds) operating the inverter in parallel with the AC source 10. Because of inductance, the increased switching frequency and close synchronization of the inverter to the utility, the inverter current can be limited to a desirable level during this brief period of parallel operation. Once the bypass contactor is fully open, the motor load is completely transferred to the VFD 910. After a suitable delay (e.g., 3 seconds), the inverter PWM frequency can be reduced to a level that can reduce heat dissipation in the inverter transistors (block 1340). The VFD 910 can then ramp down the motor using the lower PWM frequency (block 1345).

It will be appreciated the arrangements and operations described with reference to FIGS. 2-13 are provided for purposes of illustration, and may be modified in other embodiments. For example, transition control may be implemented using control circuitry other than a PLC and operations described with reference to the flowcharts may be modified.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
    a variable frequency drive (VFD) having an input configured to be coupled to an AC source and an output configured to be coupled to a load;
    a bypass switch configured to couple the AC source to the load; and
    a control circuit configured to transition the load from the VFD to the AC source by synchronizing the VFD to an AC voltage of the AC source, initiating a transition of the bypass switch, detecting a current of the VFD following initiation of the transition and disabling the VFD based on the detected current.

2. The apparatus of claim 1, wherein the control circuit is configured to initiate a closure of the bypass switch and to subsequently disable an inverter of the VFD responsive to a detected current of the inverter following the initiation of the closure.

3. The apparatus of claim 2, wherein the control circuit is configured to disable the inverter after the bypass switch couples the AC source to the load.

4. The apparatus of claim 2, wherein the control circuit is configured to detect a current of the inverter prior to initiating the closure and to disable the inverter based on a criterion derived from the detected current of the inverter prior to initiating the closure.

5. The apparatus of claim 4, wherein the control circuit is configured to detect the current of the inverter prior to initiating the closure responsive to a command to transition the load from the inverter to the AC source.

6. The apparatus of claim 2, wherein the control circuit is configured to initiate the closure responsive to an indication that the VFD is synchronized to the AC voltage of the AC source.

7. The apparatus of claim 1, wherein the control circuit is further configured to transfer the load from the AC source to the VFD by initiating an opening of the bypass switch and subsequently selectively enabling and disabling an inverter of the VFD responsive to a detected current of the inverter following the initiation of the opening.

8. The apparatus of claim 1, wherein the control circuit is further configured to transfer the load from the AC source to the VFD by increasing a pulse width modulation (PWM) frequency of the VFD, initiating an opening of the bypass switch and then decreasing the PWM frequency after the bypass switch is fully open.

9. The apparatus of claim 1, wherein the load comprises a motor.

10. A system comprising:
    a variable frequency drive (VFD) comprising an inverter having an output configured to be coupled to a motor;
    an switch configured to couple a power source to the motor to bypass the VFD; and
    a control circuit configured to synchronize the VFD to the power source, to operate the switch to couple the power source and the VFD in parallel, to detect a current of the inverter while the power source and the VFD are coupled in parallel, and to disable the inverter responsive to the detected current of the inverter.

11. The system of claim 10, wherein the control circuit is configured to disable the inverter responsive to the detected current crossing a current threshold.

12. The system of claim 11, wherein the control circuit is configured to couple the power source and the VFD in parallel during a transition from driving the motor using only the VFD to driving the motor using only the power source and wherein the control circuit is further configured to determine a current of the inverter prior to the transition and to derive the current threshold from the determined current.

13. The system of claim 10, wherein the control circuit is configured to couple the power source and the VFD in parallel during a transition from driving the motor using only the power source to driving the motor using only the VFD and wherein the control circuit is further configured to selectively enable and disable and enable the inverter responsive to the current during the transition.

14. The system of claim 10, wherein the control circuit is configured to couple the power source and the VFD in parallel during a transition from driving the motor using only the power source to driving the motor using only the VFD and wherein the control circuit is further configured to increase a PWM frequency prior to coupling the power source and the VFD in parallel and to reduce the PWM frequency when power source is no longer coupled to the motor.

15. The system of claim 10, wherein the switch comprises an electromechanical switch.

16. A method comprising:
   synchronizing a VFD to a power source;
   operating a bypass switch to couple the power source and the VFD in parallel to a motor;
   detecting a current of an inverter of the VFD while the power source and the VFD are coupled in parallel; and
   subsequently disabling the inverter of the VFD responsive to the detected current of the inverter.

17. The method of claim 16, wherein subsequently disabling the inverter of the VFD responsive to the current of the inverter comprises disabling the inverter responsive to the current crossing a current threshold.

18. The method of claim 17, wherein operating the bypass switch to couple the power source and the VFD in parallel to the motor comprises coupling the power source and the VFD in parallel during a transition from driving the motor using only the VFD to driving the motor using only the power source and wherein the method further comprises determining a current of the inverter prior to the transition and deriving the current threshold from the determined current.

19. The method of claim 18, further comprising:
   increasing a PWM frequency of the inverter;
   coupling the power source and the VFD in parallel during a transition from driving the motor using only the power source to driving the motor using only VFD with the inverter using the increased PWM frequency; and then
   reducing the PWM frequency when the power source is no longer coupled to the motor.

20. The method of claim 16, wherein operating the bypass switch to couple the power source and the VFD in parallel to the motor comprises coupling the power source and the VFD in parallel during a transition from driving the motor using only the power source to driving the motor using only the VFD and wherein the method comprises selectively enabling and disabling the inverter responsive to the current during the transition.

* * * * *